United States Patent [19]

Yamazaki et al.

[11] Patent Number: 4,567,217
[45] Date of Patent: Jan. 28, 1986

[54] STEERING WHEEL MADE OF SOFT RESIN

[75] Inventors: Yoshio Yamazaki, Aichi; Masahiro Takimoto, Mie; Satoshi Ohta, Aichi, all of Japan

[73] Assignee: Toyoda Gosei Co. Ltd., Aichi, Japan

[21] Appl. No.: 694,314

[22] Filed: Jan. 24, 1985

[30] Foreign Application Priority Data

Jan. 27, 1984 [JP] Japan ................................. 59-11884

[51] Int. Cl.$^4$ .................. C08L 27/00; B32B 15/08; B62D 1/04; C08K 5/10
[52] U.S. Cl. ................................. 524/296; 524/297; 524/525; 524/527; 525/225; 525/226
[58] Field of Search .............. 525/225, 226, 239; 524/525, 527, 296, 298

[56] References Cited

U.S. PATENT DOCUMENTS

| | | | |
|---|---|---|---|
| 4,340,530 | 7/1982 | Higashiguchi et al. | 524/296 |
| 4,458,060 | 7/1984 | Yamane et al. | 526/292.3 |

FOREIGN PATENT DOCUMENTS

| | | | |
|---|---|---|---|
| 0078045 | 6/1980 | Japan | 525/239 |
| 0078044 | 6/1980 | Japan . | |
| 0005843 | 1/1981 | Japan . | |
| 0195710 | 5/1981 | Japan . | |
| 0092024 | 7/1981 | Japan . | |
| 0010636 | 1/1982 | Japan | 524/527 |
| 0195712 | 12/1982 | Japan . | |
| 0160337 | 9/1983 | Japan | 525/239 |
| 0210953 | 12/1983 | Japan | 525/239 |
| 0043045 | 3/1984 | Japan | 525/525 |

OTHER PUBLICATIONS

Derwent Abs. 84-296943/48 (J59182833) (1984) Kanegafuchi.
Derwent Abs. 84-278363/45 (J59170133) (1984) Nippon Zeon KK.
Derwent Abs. 84-277597/45 (EP124371) (1984) Chisso Corp.

Primary Examiner—Herbert J. Lilling
Attorney, Agent, or Firm—Cushman, Darby & Cushman

[57] ABSTRACT

A steering wheel is disclosed, which is produced by injection molding a resin composition comprising (i) a crosslinked vinyl chloride polymer having a gel fraction of at least 20% and a non-gelled portion having an average polymerization degree of from 2000 to 3000, (ii) a non-crosslinked vinyl chloride homopolymer having an average polymerization degree of from 800 to 1000, and (iii) a liquid plasticizer, wherein the weight ratio of polymer component (i) to polymer component (ii) is from 50/50 to 80/20 and (iii) the amount of liquid plasticizer is from 70 to 130 parts by weight per 100 parts by weight of the total amount of the two polymers (i) and (ii). The steering wheel has excellent properties with respect to uniformity in matte surface, wear resistance and lightfastness.

4 Claims, 1 Drawing Figure

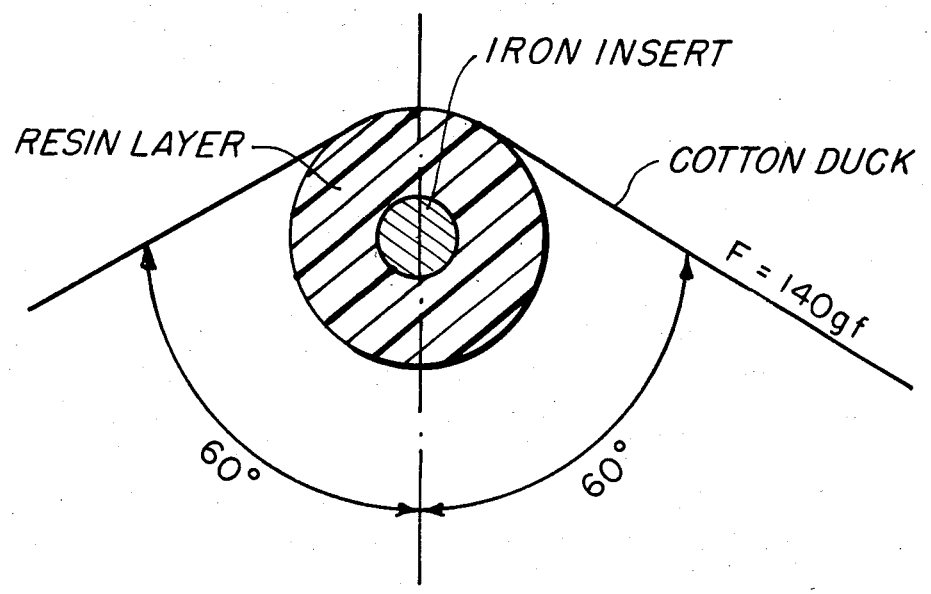

STEERING WHEEL MADE OF SOFT RESIN

FIELD OF THE INVENTION

The present invention relates to a steering wheel produced by injection molding a resin composition containing a crosslinked vinyl chloride polymer, a non-crosslinked vinyl chloride homopolymer and a liquid plasticizer.

BACKGROUND OF THE INVENTION

The principal function of automotive steering wheels is, of course, steering the car. In addition, steering wheels which are kept in contact with the driver's hands while the car is running must satisfy several other requirements, among which the following are important; (1) good appearance, (2) good touch to the hands (non-stickiness plus "soft touch" which is gaining increasing acceptance by drivers), (3) freedom from deteriorations due to sunlight such as discoloration, cracking and bleeding of additives, and (4) resistance to wear due to constant friction with the hands.

Soft vinyl chloride resins are commonly used as the material for steering wheels because of their relatively low cost and good weathering properties. However, it is very difficult to produce injection moldings having satisfactory wear resistance and a uniform matted appearance. The reasons are as follows: (1) the most effective way to provide a vinyl chloride resin with an improved wear resistance without increasing its hardness is to increase the average polymerization degree as determined by the solution viscosity method (hereunder abbreviated as $\bar{P}$) of the resin, but if $\bar{P}$ is increased, the corresponding decrease in the fluidity of the resin will most likely cause uneven luster in the surface of the injection molded article; (2) if an inorganic material such as calcium carbonate or talc is added in an attempt at providing a matted appearance, the wear resistance of the resin is reduced and uniformity in luster is not obtained while only an incomplete matting effect is achieved; (3) a mold having an embossed pattern is highly effective for the purpose of providing a matted appearance but no appreciable improvement in matte uniformity is obtained, and in addition, this method does not ensure consistent product quality in mass production since the embossed pattern wears as the number of molding cycles is increased. For these reasons, coating is necessary for imparting uniform luster to conventional steering wheels made of soft PVC (hardness $\leq$70 Hs, type A according to JIS K 6301). However, a relatively good uniformity in luster can only be obtained at the expense of wear resistance. Furthermore, coated PVC steering wheels are not only expensive but also prone to suffer peeling problems under hostile conditions.

Crosslinked vinyl chloride polymers or compositions made of crosslinked vinyl chloride polymers and non-crosslinked polymers could be used for providing matting effects as shown in several prior art references such as Japanese Pat. Application (OPI) Nos. 117550/1979, 78044/1980, 78055/1980, 5843/1981, 92024/1981, 195710/1982, 195711/1982, 195712/1982, and 195713/1982 (the term "OPI" as used herein mean a "published unexamined Japanese Patent Application"). The polymers or compositions shown in these references are effective for providing satisfactory matting effects, but they are entirely ineffective for the purpose of providing high matte uniformity, and no saleable products are obtainable without coatings.

The reason for these difficulties is that conventional quality evaluation techniques are directed primarily to products made by rolling, calendering and extrusion molding, and in a few cases, to injection moldings of very simple configurations. Therefore, such techniques are ineffective for evaluating the uniformity in luster of injection molded steering wheels having a complex shape. In order to achieve a uniform luster in the products shaped by rolling, calendering or extrusion molding techniques, primary care should be taken in the width direction although controlling the uniformity in the length direction is relatively easy. On the other hand, the entire surface of the article being shaped by injection molding must be controlled for providing the desired uniformity in luster, and this is why considerable difficulty is involved in achieving high uniformity in luster by injection molding techniques.

With injection molding, providing a matted appearance for the entire surface of complex shapes such as steering wheels involves a much greater difficulty than in the case of simple shapes such as flat plates, rods and trays. In addition to the complexity of its shape, the steering wheel has an iron insert placed not only on the periphery of the ring portion but also in the spokes. Because of these inserts, a resin stream bumps violently against various parts of the mold to experience a sudden change in its flowing direction. Therefore, the steering wheel prepared by injection molding has an inherent tendency to produce a glossy surface. The molten resin should have an optimum viscosity for achieving a high uniformity in its gloss. A resin stream having a higher viscosity will deform or displace the inserts in the steering wheel. On the other hand, the higher the molecular weight of the resin, the more wear resistant the resulting steering wheel. Since high wear resistance is required of the steering wheel, this tradeoff between uniformity in luster and wear resistance introduces considerable difficulty in designing steering wheels.

SUMMARY OF THE INVENTION

An object of the present invention is to provide a steering wheel having excellent properties with respect to appearance, touch to the hands, weather ability and wear resistance.

As a result of various studies to produce a steering wheel having such desired properties, the present inventors have found that the intended steering wheel having an uniformly matted surface and the necessary properties can be obtained only when the proportions of a crosslinked vinyl chloride polymer and an non-crosslinked vinyl chloride homopolymer, as well as the gel fraction and the degree of polymerization of the non-gelled portion of said crosslinked polymer are controlled to be within specified ranges. The present invention has been accomplished on the basis of these findings.

The present invention is a steering wheel produced by injection molding a resin composition comprising (i) a crosslinked vinyl chloride polymer having a gel fraction of at least 20 wt %, preferably from 20 to 90 wt %, and an nongelled portion having an average polymerization degree of from 2000 to 3000, (ii) an non-crosslinked vinyl chloride homopolymer having an average polymerization degree of from 800 to 1000 and (iii) a liquid plasticizer, wherein the weight ratio of polymer component (i) to polymer component (ii) is from 50/50 to 80/20 and the amount of liquid plasticizer is from 70 to 130 parts by weight per 100 parts by weight of the total amount of the two polymer components (i) and

BRIEF DESCRIPTION OF THE DRAWING

FIGURE is a cross sectional view of a steering wheel (ii). and is to show the manner how a sheet of plain cotton duck is stretched on the ring portion of a steering wheel sample in a wear resistance test performed in the Example.

DETAILED DESCRIPTION OF THE INVENTION

The term "gel fraction" as used in the present invention is defined by the following formula:

Gel fraction (%) = $W_1$2 × 100 wherein $W_1$ (g) is the weight of a dried insoluble portion of a crosslinked vinyl chloride polymer (i). The dried insoluble portion is obtained by the following procedure: Exactly 2 grams of a crosslinked vinyl chloride polymer (i) is put into a 500 ml glass beaker together with 400 grams of tetrahydrofuran, and the mixture is agitated for 1 hour at room temperature (23° C., 65% PH) to make a solution which is then filtered through a filter to separate the insoluble portion of the polymer, followed by drying.

The average polymerization degree (hereinafter referred to as "$\bar{P}$") as used in the present invention is determined by the solution viscosity method as defined in JIS K 6721 (Testing Methods for Polyvinyl Chloride), provided that a crosslinked polymer sample is prepared by adding methanol to the filtrate containing a tetrahydrofuran soluble portion of the crosslinked polymer, recrystallizing the polymer and then drying.

If the gel fraction of the crosslinked vinyl chloride polymer (i) used in the present invention is less than 20%, the matting effect of the polymer is appreciably decreased. If the non-gelled portion of the crosslinked polymer (i) has a $\bar{P}$ value of lower than 2000 or if the non-crosslinked vinyl chloride homopolymer (ii) has a $\bar{P}$ value of less than 800, the wear resistance of the resulting resin product is considerably reduced. If the $\bar{P}$ value of the non-gelled portion of the crosslinked polymer (i) and the $\bar{P}$ value of the non-crosslinked polymer (ii) exceed 3000 and 1000, respectively, a uniform matte surface is not obtained. If the proportion of the crosslinked polymer (i) to the non-crosslinked homopolymer (ii) is outside the range of from 50/50 to 80/20, the matting effect of these polymers is greatly reduced or an uneven matte surface results. If less than 70 parts by weight of the liquid plasticizer is incorporated in the polymer blend, a steering wheel having "soft" tough to the hands is not obtained. If the amount of the plasticizer is greater than 130 parts by weight, undesirable bleeding occurs.

The crosslinked vinyl chloride polymer (i) of the present invention can be produced in a conventional manner as described in, for example, Japanese Patent Application (OPI) No. 117550/79. Comonomers which can be used for producing the polymer (i) include diallyl phthalates such as diallyl phthalate, diallyl isophthalate, diallyl terephthalate, etc; diallyl esters of ethylenically unsaturated dibasic acid such as diallyl malate, diallyl fumarate, diallyl itaconate, etc; diallyl esters of saturated dibasic acid such as diallyl adipate, diallyl azelate diallyl sebacate, etc; divinyl ethers such as diallyl ether, triallylcyanulate, triallyl isocyanulate, triallyl trimellitate, ethylene glycol divinyl ether, n-butanediol divinyl ether octadecan divinyl ether, etc; di(meth)acryl esters of polyhydric alcohols such as ethylene glycol dimethacrylate, diethylene glycol dimethacrylate, diethylene glycol diacrylate, triethylene glycol methacrylate etc; tri(meth)acryl esters of polyhydric alcohols such as trimethylolpropane trimethacrylate, trimethylolethane trimethacrylate, trimethylolpropane triacrylate, trimethylolmethane triacrylate, tetramethylolmethane triacrylate, etc; polyfunctional compounds such as bismethacryloyloxyethylene phthalate, 1,3,5-triacryloylhexahydrotriazine, etc.

The non-crosslinked vinyl chloride homopolymer (ii) can be produced by a conventional manner, and the liquid plasticizer (iii) of the present invention is a conventional plasticizer which is liquid at room temperature, such as esters whose alcohol moiety generally has 4 to 13 carbon atoms. From the view point of economy and preventing bleeding, phthalic esters and trimellitic esters are preferably used for the purpose.

In addition, various additives such as a stabilizer, a UV absorber, a pigment, etc. can be compounded in the resin composition of the present invention.

The resin composition can be injection molded to produce a steering wheel in a conventional manner. For example, the resin composition is injection molded under the conditions that a resin temperature is 150°–200° C., injection pressure is 30–100 kg/cm².

The present invention is described in great detail with reference to the following examples. Unless otherwise indicated, all parts are by weight.

EXAMPLE AND COMPARATIVE EXAMPLE

Crosslinked vinyl chloride polymers indicated as "crosslinked PVC polymer" in Table and uncrosslinked vinyl chloride homopolymers indicated as "uncrosslinked PVC polymer" in Table were blended in the proportions shown in Table. Twelve formulations were made, and in each formulation, the following components were also incorporated:

| Dioctyl phthalate | 100 part |
| Organotin stabilizer | 2.0 part |
| Ultraviolet absorber | 0.2 part |
| Pigment | 1.0 part |

The resin compositions (Sample Nos. 1 to 12 in Table) were shaped by injection molding under the following conditions:

Molding machine: IS-315-AN (manufactured by Toshiba Corp.)

Mold: For 2-spoke steering wheel with inserts, wheel diameter = 38 cm, cavity temp. = 30° C.

Feed temperature and injection pressure were selected from the respective ranges of from 180° to 200° C. and from 50 to 80 kg/cm² so that the best appearance was obtained for each sample.

The formed resin compositions were checked for their respective characteristics by the following procedure. The results are shown in Table below.

(1) Matting effect

Each sample was compared visually with a flat plate of the same color that showed a reflectance of 10% at incidence and reflection angles of 60°. Samples having no gloss were indicated as "A", and highly glossy samples were indicated as "B".

(2) Uniformity in matte surface

As compared with a soft PVC sample coated with a uniform matte surface, samples having no practical difference from the control were indicated as "A" and those having distinct or significant differences were indicated as "B".

(3) Wear resistance

A sheet of plain cotton duck (#10, JIS L 3102, width: 45 mm) was stretched on the ring portion of an injection molded sample of steering wheel under tension of 140 gf as shown in FIGURE. Fifty thousand cycles of sinusoidal reciprocation (amplitude: 150 mm, period: 1 second) were applied to the cotton duck which was rubbed against the steering wheel. Samples which showed no change in the frictional surface or those whose resin layer was left intact were indicated as "A", and those in which the resin layer was partly abraded were indicated as "B".

(4) Lightfastness

The samples were irradiated with UV rays for 400 hours in a fade-O-meter (Model FV)(JIS B 7751, black panel temperature: 83° C.). Those samples having no defects such as discoloration, bleeding of plasticizer and cracking were indicated as "A".

As shown in Table, the steering wheel samples prepared according to the present invention were satisfactory in respect of matting effect, uniformity in matte surface, wear resistance and lightfastness.

While the invention has been described in detail and with reference to specific embodiments thereof, it will be apparent to one skilled in the art that various changes and modifications can be made therein without departing from the spirit and scope thereof.

What is claimed is:

1. A steering wheel produced by injection molding a resin composition comprising (i) a crosslinked vinyl chloride polymer having a gel fraction of at least 20% and an non-gelled portion having an average polymerization degree of from 2000 to 3000, (ii) an non-crosslinked vinyl chloride homopolymer having an average polymerization degree of from 800 to 1000, and (iii) a liquid plasticizer, wherein the weight ratio of polymer component (i) to polymer component (ii) is from 50/50 to 80/20 and (iii) the amount of liquid plasticizer is from 70 to 130 parts by weight per 100 parts by weight of the total amount of the two polymers (i) and (ii).

2. A steering wheel as in claim 1, wherein said liquid plasticizer is an ester of phthalic acid or trimellitic acid and an alcohol.

3. A steering wheel as in claim 2, wherein said alcohol has 4 to 13 carbon atoms.

4. A steering wheel as in claim 1, wherein the gel fraction of said crosslinked vinyl chloride polymer is from 20 to 90%.

* * * * *

TABLE

| Polymer Components | | $\bar{P}$ of non-gelled portion | Sample No. | | | | | | | | | | | |
|---|---|---|---|---|---|---|---|---|---|---|---|---|---|---|
| | | | 1 | 2 | 3 | 4 | 5 | 6* | 7* | 8 | 9 | 10 | 11 | 12 |
| Crosslinked PVC Polymer | #1 | 2500 | 20 | 50 | 80 | 100 | 20 | 50 | 80 | 20 | 50 | 80 | — | — |
| Crosslinked PVC Polymer | #2 | 1800 | — | — | — | — | — | — | — | — | — | — | 50 | 80 |
| Non-crosslinked PVC Polymer | #1 | 1300 | 80 | 50 | 20 | — | — | — | — | — | — | — | 50 | |
| Non-crosslinked PVC Polymer | #2 | 800 | — | — | — | — | 80 | 50 | 20 | — | — | — | — | — |
| Non-crosslinked PVC Polymer | #3 | 700 | — | — | — | — | — | — | — | 80 | 50 | 20 | — | — |
| Matting effect | | | B | A | A | A | B | A | A | B | A | A | A | A |
| Uniformity in matte surface | | | B | B | B | B | A | A | A | A | A | A | B | B |
| Wear resistance | | | B | A | A | A | B | A | A | B | B | B | B | B |
| Light fastness | | | Plasticizer bleeded | A | A | A | Plasticizer bleeded | A | A | Plasticizer bleeded | Plasticizer bleeded | A | Plasticizer bleeded | A |

*Samples of the present invention

| | | |
|---|---|---|
| Crosslinked PVC Polymer | #1 | (gel fraction: 30%; Nipolit CD-25 manufactured by Chisso Co., Ltd.) |
| Crosslinked PVC Polymer | #2 | " Nipolit CD-18 manufactured by Chisso Co., Ltd.) |
| Non-crosslinked PVC Polymer | #1 | — Nipolit SM manufactured by Chisso Co., Ltd.) |
| Non-crosslinked PVC Polymer | #2 | — Nipolit SR manufactured by Chisso Co., Ltd.) |
| Non-crosslinked PVC Polymer | #3 | — Nipolit SE manufactured by Chisso Co., Ltd.) |